Nov. 14, 1961   J. A. JOHNSON   3,009,115
POWER SUPPLY CIRCUIT
Filed June 20, 1960
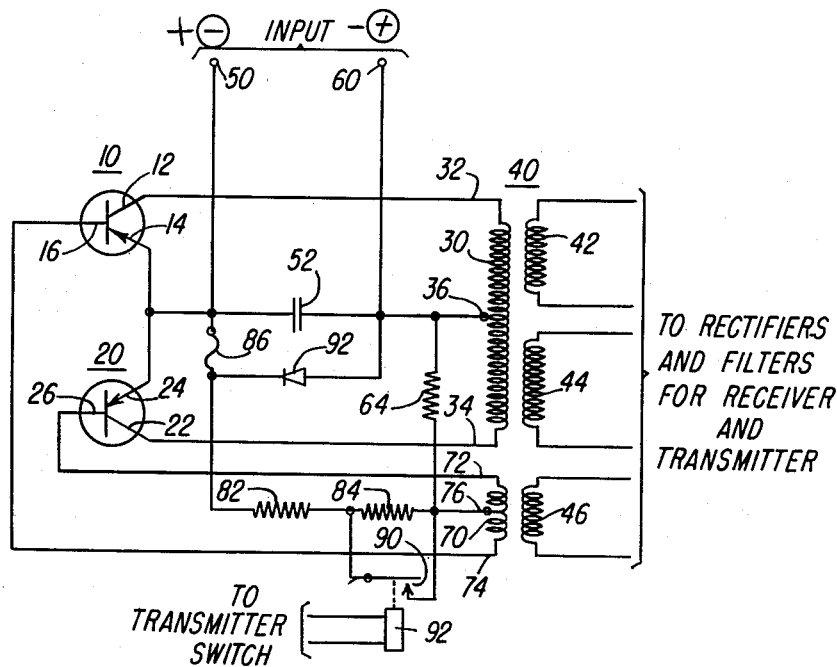
INVENTOR.
JEROME A. JOHNSON
BY
*Mueller & Aichele*
ATTYS.

United States Patent Office 3,009,115
Patented Nov. 14, 1961

3,009,115
POWER SUPPLY CIRCUIT
Jerome A. Johnson, Lombard, Ill., assignor to Motorola, Inc., Chicago, Ill., a corporation of Illinois
Filed June 20, 1960, Ser. No. 37,201
8 Claims. (Cl. 331—113)

This invention relates generally to power supplies and in particular to a power supply utilizing transistors.

In most motor vehicles, the battery source voltage has been increased in the past few years from 6 volts to 12 volts. With the advent of such increased battery potential a need became apparent for power supplies which were compatible with either six volt or 12 volt battery sources. Transistorized power supplies proved to be especially adaptable to battery sources having voltages of 6 or 12 volts because of the small size of transistors and their characteristic of instantaneous conduction which allows them to be used as switches. However, transistors have some disadvantages among which are susceptibility to high ambient temperatures and the fact that transistors generally will not withstand overvoltages as well as vacuum tubes. Also, many transistorized power supplies have not been entirely satisfactory because one or more of the transistors in such power supplies would be damaged if a battery potential of reverse polarity was connected thereto. Power supplies having simple, low-cost reverse polarity protection have been desired but not readily achieved. Also, when a transistorized power supply is used with a radio transmitter and receiver, the heavy current drain when the transmitter is used and the lower current drain when only the receiver is used have presented problems in polarity protection circuit design.

Thus, it is an object of the present invention to provide a transistorized power supply having simple, low-cost protection from reverse polarity connection.

Another object of the present invention is to provide a transistorized power supply having reverse polarity protection but which does not affect the normal operation of the power supply and which will provide protection when used with a radio transmitter under both standby and transmit conditions.

A feature of the invention is the provision of a relatively low amperage fuse in the base circuit of a transistorized power supply, such fuse blowing or melting prior to damage to the transistors when a reverse polarity condition occurs.

Still another feature of the invention is the provision of a transistorized power supply having reverse polarity protection through use of a fuse connected between one input voltage terminal and the center tap of the feedback winding of a transformer the ends of such feedback winding being coupled to the bases of two transistors.

A still further feature of the invention is the provision of a transistorized power supply utilizing a diode in series with a low amperage fuse to provide protection to such power supply when inadvertent connection is made to a reverse polarity source.

In the drawing there is shown a schematic diagram of a portion of a transistorized power supply wherein the invention is utilized.

In practicing the invention, there is provided a transistor oscillator power supply, or inverter, utilizing a power transformer and two power type transistors connected to the primary winding and the feedback winding of such transformer. A fuse in series with a semiconductor diode is connected across the input terminals of the battery supply voltage. The anode of the diode is connected to the normally negative terminal of the battery input voltage supply. Under normal voltage polarity conditions, the fuse conducts energizing current to the transistor base network and only reverse leakage current flows through the diode. When polarity of the battery is reversed, the diode conducts a large surge current to cause the fuse to melt and open the base current path but the duration of the surge current is such that the diode and the transistors are not damaged. Although the described embodiment of the invention is for a power supply, the circuit may be used in a power amplifier.

Referring now to the drawing, a schematic diagram is shown of a portion of a power supply circuit having two power type transistors. This circuit comprises a transistor oscillator for converting a direct current voltage to an alternating current voltage which can be stepped-up through a transformer and then rectified and filtered for use with various equipment. The circuit will be described for use with a radio transmitter and receiver for 2-way communication purposes. Collectors 12 and 22 of transistors 10 and 20 are connected to ends 32 and 34 of power transformer 40. Emitters 14 and 24 are connected in common to input voltage terminal 50 which under normal polarity conditions is the positive terminal. Terminal 60 is normally the negative terminal. Capacitor 52 is an input filter capacitor connected between input terminals 50 and 60. Feedback winding 70 has end 72 connected to base 26 of transistor 20 and end 74 is connected to base 16 of transistor 10. Starting resistor 64 is connected between center tap 36 of primary winding 30 and center tap 76 of feedback winding 70. Resistors 82 and 84 are feedback current limiting resistors connected to the center tap 76 of feedback winding 70 and through fuse 86 to input 50. Resistor 84 is shorted out by contact 90 when transmit relay 92 is energized, thereby providing additional drive current when the transmitter is used. Semiconductor diode 92 may be a silicon diode and is connected in series with fuse 86 between input terminals 50 and 60. The anode of diode 92 is connected to terminal 60.

During normal polarity conditions when terminal 50 is positive and terminal 60 is negative, diode 92 has only reverse leakage current flowing through it from the input source voltage. The remainder of the circuit operates as if diode 92 were not present. Feedback or drive current flows from center tap 76 through resistances 84, 82 and fuse 86 to positive input terminal 50. Alternate conduction through the switching action of transistors 10 and 20 provides a pulsating voltage to transformer 40. Saturation of the core causes transistors 10 and 20 to alternately switch off and on through feedback winding 70. Transformer 40 increases the voltage to secondary windings 42, 44 and 46.

With input reverse polarity present, when terminal 50 is negative and terminal 60 is positive, as indicated by the polarity markings shown in circles in the drawing, a large surge current flows through diode 92 and fuse 86 which are both directly connected across inputs 50 and 60. Fuse 86 may have a rating of two or three amperes and may be melted by the current carrying capabilities of the small silicon diode 92 without damage to the diode since the surge current is of short duration. The fuse rating may be 75 to 100 percent higher than the maximum drive current required for the power supply. When fuse 86 blows or melts there is no connection between bases 16 and 26 of transistors 10 and 20 and input 50 and the transistors are the equivalent of open circuits, except for negligible collector leakage current which does not cause any damage to the transistors. The power supply is thus protected from excessive current flow in the transistors which may have resulted if the base circuit had not been open.

Thus, the invention provides for expensive and simple protection against excessive collector current flow by opening the base circuit when the power supply source voltage polarity is reversed. A diode is series connected with a fuse between the input voltage terminals. The diode will conduct current under reverse polarity conditions causing the fuse to melt before the transistors in the power supply are damaged by excessive current. The ampere rating of the fuse is low enough to also prevent damage to the diode when it conducts. The circuit may afford reverse polarity protection to existing power supplies with only the diode and fuse required as additional parts.

I claim:

1. A transistorized power supply including in combination a power transformer having first and second windings, first and second transistors each having base, collector and emitter electrodes, a semiconductor diode, a fuse, resistance means, voltage supply means having first and second input terminals for applying unidirectional potential, said first terminal normally having positive polarity and said second terminal normally having negative polarity, said base electrodes of said transistors being coupled to said second winding of said transformer, said emitter electrodes of said transistors being coupled to each other, said fuse and said resistance means being connected in series between said first input terminal and said second winding, said fuse and said diode being connected in series between said emitters and said second input terminal, said diode conducting current from said voltage supply means to melt said fuse when a change in polarity of said input terminals occurs so that said second terminal is positive and said first terminal is negative, thereby protecting said transistors from conducting excessive current.

2. A transistorized power supply including a power transformer, first and second transistors each having base, collector and emitter electrodes, a diode, a fuse, resistance means, first and second input terminals for applying unidirectional voltage, said base electrodes of said transistors being coupled to said power transformer, said fuse and said resistance means being connected in series between said first input terminal and said power transformer, said emitter electrodes of said transistors being coupled to each other and having said fuse and said diode connected in series between said emitters and said second input terminal, said second terminal normally having negative polarity of voltage applied thereto, said diode conducting current to melt said fuse whenever said input terminals have reverse polarity applied thereto whereby said second terminal is positive.

3. A transistorized power supply including a power transformer having first and second windings, first and second transistors each having base, collector and emitter electrodes, a semiconductor diode, a fuse, first and second input terminals for applying direct current potentential, said second terminal normally being of negative polarity, said base electrodes of said transistors being coupled to said second winding of said power transformer, said emitter electrodes of said transistors being coupled to each other and having said fuse and said diode connected in series between said emitters and said second input terminal, said diode conducting to melt said fuse when said second terminal becomes positive through polarity change of the potential applied thereto.

4. A power supply including first and second transistors each having base, collector and emitter electrodes, a power transformer including a primary winding having a center tap and a feedback winding having a center tap, a fuse, a diode, direct current potential means having first and second input voltage terminals, said first input voltage terminal under normal conditions having positive polarity, and a capacitor connected between said first and second terminals, said base electrode of each of said transistors being connected to one end of said feedback winding, said emitter electrode of each of said transistors being connected to each other and coupled to said first input voltage terminal, said fuse and said diode being connected in series across said first and second input voltage terminals, said fuse interrupting the applied voltage through conduction of said diode when said first and second input voltage terminals are reversed so that said first input voltage terminal is negative, with the melting of said fuse protecting said transistors from excessive current flow.

5. A power supply including first and second transistors each having base, collector and emitter electrodes, a power transformer including a first primary winding having a center tap, and first and second ends and a second feedback winding having a center tap and first and second ends, a fuse, a diode, a capacitor, first and second resistance means, and first and second input voltage terminals, said first input voltage terminal having a normal positive polarity, each of said base electrodes of said transistors being connected to said first and second ends of said second winding, said emitter electrodes of said transistors being connected together and coupled to said first input voltage terminal, said capacitor being connected across said first and second input voltage terminals, said first resistance means being connected between said center taps of said first and second windings, said fuse and said diode being connected in series across said first and second input voltage terminals, said second resistance means being connected between said center tap of said second winding and the junction point of said diode and said fuse, said fuse melting and interrupting the applied voltage through conduction of said diode when said first and second input voltage terminals are reversed so that said first input voltage terminal is negative, thereby protecting said transistors from damage through excessive current flow.

6. A power supply including first and second transistors each having base, collector and emitter electrodes, power transformer including a first and second windings each having first and second ends and a center tap, a fuse, a semiconductor diode, a capacitor, first and second resistance means, and first and second input voltage terminals for applying direct current potential, said first input voltage terminal normally having positive polarity, said base electrodes of said transistors being connected to said first and second ends of said second winding, said emitter electrodes of said transistors being connected together and coupled to said first input voltage terminal, said capacitor being connected across said first and second input voltage terminals, said fuse and said diode being connected in series between said first and second input voltage terminals and shunting said capacitor, said first resistance means being connected between said center taps of said first and second windings, said second resistance means being connected between said center tap of said second winding and the junction of said diode and said fuse, said diode conducting current upon reversal of polarity at said input terminals thereby melting said fuse to protect said transistors from excessive current flow, the current required to melt said fuse having a duration and magnitude which prevents damage to said diode.

7. A transistor signal translating circuit including in combination, a transistor having input and output electrodes, circuit means coupled to said electrodes to form the signal translating circuit together with said transistor, power supply conductors to provide energizing current for said circuit, a fuse series connected between said input electrode and one of said power supply conductors so that energizing current for said input electrode flows through said fuse, and a diode coupled between said fuse and the other power supply conductor, said diode being poled to be non-conductive with correct voltage polarity applied to said power supply conductors and to be conductive through said fuse to open circuit the same and open circuit the current path for said transistor input electrode with incorrect voltage polarity applied to said power supply conductors.

8. A transistor oscillator circuit including in combination, a transistor having base, emitter and collector electrodes, transformer means having winding means coupled to said electrodes to form an oscillator circuit together with said transistor, first and second power supply conductors normally having positive and negative voltage polarity respectively to provide energizing current for said oscillator circuit, a fuse series connected between said base electrode and said first power supply conductor so that energizing current for said input electrode flows through said fuse, and a diode coupled between said fuse and said second power supply conductor, said diode being poled to be non-conductive under normal voltage polarity conditions and to be conductive through said fuse to open circuit the same and open circuit the current path for said transistor base electrode when incorrect voltage polarity is applied causing said first and second power supply conductors to have negative and positive polarity respectively.

No references cited.